(12) United States Patent
Tomada et al.

(10) Patent No.: US 8,939,090 B2
(45) Date of Patent: Jan. 27, 2015

(54) GUIDED VEHICLE

(71) Applicant: Mitsubishi Heavy Industries, Ltd., Tokyo (JP)

(72) Inventors: Tokumitu Tomada, Mihara (JP); Masahiro Inui, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/744,685

(22) Filed: Jan. 18, 2013

(65) Prior Publication Data

US 2013/0125781 A1 May 23, 2013

Related U.S. Application Data

(62) Division of application No. 12/612,851, filed on Nov. 5, 2009, now abandoned.

(30) Foreign Application Priority Data

Apr. 2, 2009 (JP) .................................. 2009-090490

(51) Int. Cl.
*B61F 5/24* (2006.01)
*B61F 5/14* (2006.01)
*F16F 15/023* (2006.01)

(52) U.S. Cl.
CPC ... *B61F 5/24* (2013.01); *B61F 5/14* (2013.01); *F16F 15/0232* (2013.01)
USPC .................... 105/453; 105/218.2; 105/224.05; 267/64.11

(58) Field of Classification Search
CPC ........ B61F 5/307; B60G 11/27; B60G 15/08; B60G 17/0521; F16F 9/049; F16F 9/04
USPC ......... 105/453, 218.2, 224.05, 218.1, 224.06; 267/64.27, 64.11, 64.13, 64.28
See application file for complete search history.

(56) References Cited

U.S. PATENT DOCUMENTS 2,998,261 A 8/1961 Bartlett
4,871,189 A 10/1989 Van Breemen
(Continued)

FOREIGN PATENT DOCUMENTS

JP 59-11955 A 1/1984
JP 8-2232 A 1/1996
(Continued)

OTHER PUBLICATIONS

Japanese Decision to Grant a Patent corresponding to 2009-090490, drafted date Mar. 19, 2013.
(Continued)

*Primary Examiner* — Mark Le
(74) *Attorney, Agent, or Firm* — Kaneska, Berner & Partners

(57) ABSTRACT

In a guided vehicle of air spring suspension for running along exclusive guideways, decreasing of center distance of the left and right air spring to mount air springs of increased dimension and increased load carrying capacity, which decreasing of the center distance induces decrease in rolling stiffness of the vehicle resulting in deteriorated ride quality and also induces difficulty in adjusting vehicle height resulting in spending long time in height adjusting operation, will not be required even when load carrying capacity of air springs is required to be increased in order to comply with increased vehicle load. A plurality of air spring elements are mounted tandem along the longitudinal direction of the vehicle with the air spring elements connected with each other so that air pressure thereof is always equal.

2 Claims, 7 Drawing Sheets

(56) References Cited

U.S. PATENT DOCUMENTS

| | | |
|---|---|---|
| 5,374,077 A | 12/1994 | Penzotti |
| 7,740,257 B2 | 6/2010 | Haire |
| 2006/0066070 A1 | 3/2006 | Haire |
| 2010/0252969 A1* | 10/2010 | Tomada et al. ............ 267/64.11 |

FOREIGN PATENT DOCUMENTS

| | | |
|---|---|---|
| JP | 2001-047830 A | 2/2001 |
| JP | 2001047830 | 2/2001 |
| JP | 2001213130 A | 8/2001 |
| JP | 2002144838 | 5/2002 |
| JP | 2002193099 A | 7/2002 |
| JP | 2005-096724 | 4/2005 |
| JP | 2005-096724 A | 4/2005 |
| JP | 2006347425 A | 12/2006 |

OTHER PUBLICATIONS

Japanese Office Action as issued on Jul. 6, 2012 in corresponding Application No. 2009-090490.

* cited by examiner

Cross sectional view along line b-b'

Cross sectional view along line a-a'

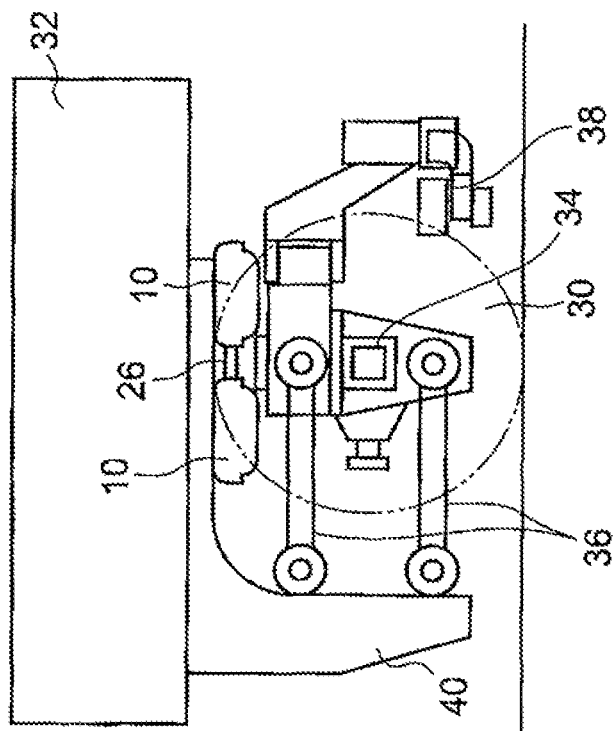
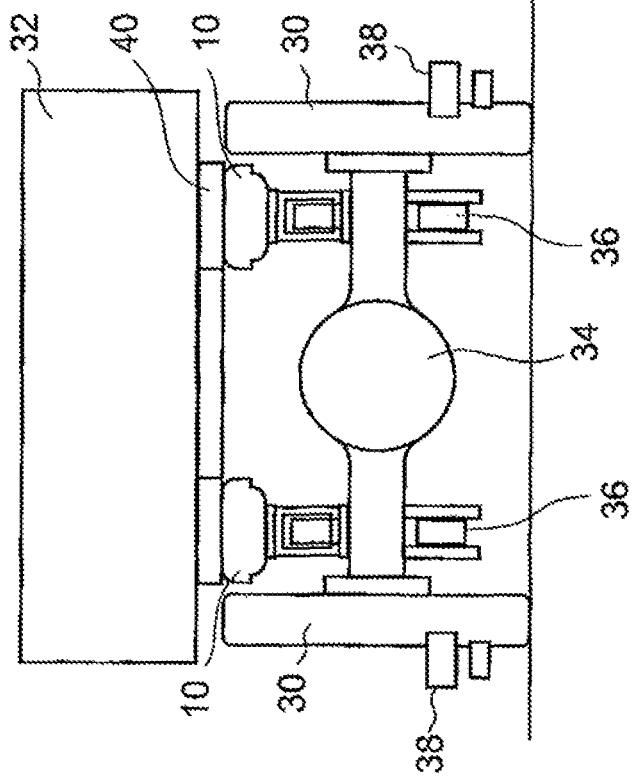

Cross sectional view along line d-d'

Cross sectional view along line e-e'

Cross sectional view along line g-g'

Cross sectional view
along line j-j'

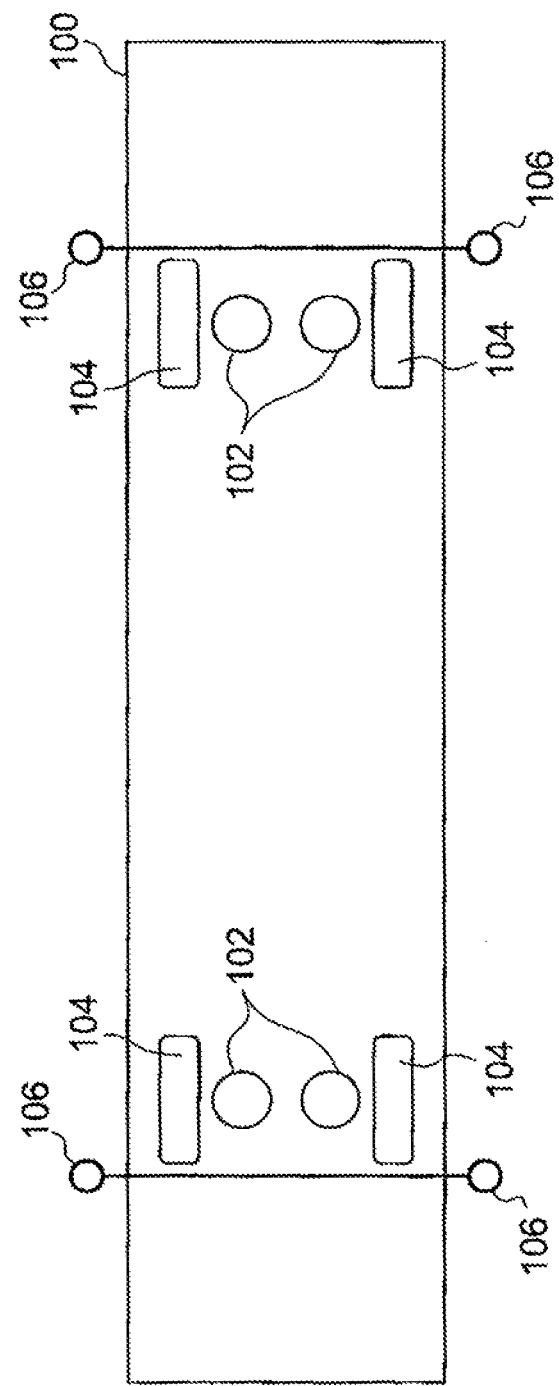

GUIDED VEHICLE

RELATED APPLICATIONS

The present application is a divisional of U.S. application Ser. No. 12/612,851, filed Nov. 5, 2009, and claims priority from, Japanese Application Number 2009-090490, filed Apr. 2, 2009, the disclosures of which are hereby incorporated by reference herein in their entirety.

BACKGROUND OF THE INVENTION

1. Field of the Invention

The present invention relates to a guided vehicle, specifically to a guided vehicle equipped with rubber tires suspended by means of air springs used as secondary suspensions or a magnetic levitated vehicle, etc.

2. Description of the Related Art

Recent years, a medium capacity transit system, one of so-called new transit systems, in which guided vehicles equipped with rubber tires travel along exclusive guideways, has become widespread, and also development work toward practical use of magnetically-levitated trains is making advances. Full automatic operation of unmanned vehicles is performed in many of these transit systems. In some case the vehicle has guide wheels to guide it along the sidewall of the guideway.

Many of vehicles used in these new transit system or magnetic levitation system adopt pneumatic suspension as secondary suspensions for the sake of improving ride quality as shown in FIG. 7. In FIG. 7, reference numeral 100 is a body of a vehicle, 102 are air springs, 104 are tires, and 106 are guide wheels for guiding the vehicle along a guide rail not shown in the drawing. Left and right tires 104 are connected by an axle covered by an axle housing.

However, the air spring 102 must be located between the axle housing and the vehicle body 100, so each of the left and right air springs 102 is located at a position inner side from the left and right tires 104 respectively when tires 104 are used. The air spring 102 is composed of a bellows (or diaphragm) made of multi-plied rubber and reinforcing fiber layers and it can withstand a pressure of about 2.0 MPa, however, operating pressure is limited generally to 0.59 MPa or lower in consideration of durability of the bellows (or diaphragm).

Further, the bellows (or diaphragm) act as a spring by its expansion and contraction in vertical directions, so it is shaped to be circular in plan view in order to evade occurrence of local stress concentration which tends to occur if it is not circular in plan view. Therefore, when load to be supported by the air spring increases; the outer diameter of the air spring must be increased to increase its effective load area so that inside pressure of the bellows (or diaphragm) does no exceed the limit pressure. With air springs of large outer diameter, distance between the left and right air springs decreases, resulting in decreased rolling stiffness of the vehicle, that is, resistance to rolling of the vehicle decreases and ride quality is deteriorated. Further, in order to manufacture an air spring of large outer diameter unpracticed heretofore, it is needed to make a mold to form constituent parts, which requires fairly large cost.

Furthermore, with decreased distance between the left and right air springs, tilt adjustment of the vehicle body by adjusting the left and right air spring becomes not easy, and more time is needed to perform tilt adjustment of the vehicle body. It may be thinkable to broaden the tread, i.e. distance between the left and right wheel in order to locate the air springs of increased outer diameter increased to comply with increased vehicle load without decreasing center distance of left and right air spring. However, larger cross-section surface of guideways are required with increased tread of the guided vehicle, a lot of money will be required for provision of infrastructure. As to domestic new transit systems, vehicle width is determined in standardization and cannot be increased by preference.

As to an art to improve stiffness and damping of rolling of a vehicle equipped with air springs, a rear suspension device of a bus is disclosed for example in a patent literature 1 (Japanese Laid-Open Patent Application No. 2001-47830).

According to the literature, in a rear suspension device comprising; air springs located just under the straight side members (component members of the chassis frame) at positions front ward and rear ward from the rear axle housing, and shock absorbers located between the rear axle housing and the straight side members to attenuate vibration of the bellows (or diaphragm) of the air springs; the rear shock absorbers are located outer side from the side members, thereby increasing distance between the left and right shock absorbers, and thereby making the distance between the left and right shock absorber of the rear shock absorbers nearly equal to that of the front shock absorbers. By this, stiffness of rolling and damping of the rolling effectuated by the rear shock absorber is improved, and the effects of suppression of rolling by the rear and front shock absorber become nearly balanced.

In a patent literature 2 (Japanese Laid-Open Patent Application No. 2005-96724) is disclosed a method of controlling tilting of a vehicle body. The invention relates to tilt controlling of the body of a vehicle having front and rear bogies on which the vehicle body is supported by means of air springs.

Tilt control is performed by controlling supply and drain of air to four air springs located on the front and rear bogies at left and right positions respectively. According to the invention, when the vehicle runs through a curve section of rail road, two air springs of either of the front or rear bogie are communicated with each other so that the vehicle body is supported by apparent three-point support on the bogies. In this state, tilting of the vehicle body is controlled by supplying or draining air only to or from air springs not communicated with each other. In this way, air consumption for body tilt control can be decreased.

However, the rear suspension device of a bus as disclosed in the patent literature 1 aims to attain low-floor construction of a bus. As rear axle load is two times that of the front axle in the bus, two air springs of the same size are attached at a forward and rearward position from the rear axle housing for each of left and right side of the vehicle. The left and right air springs depart from each other by more than a little distance, and the two air springs are not communicated with each other. Therefore, the rear axle is supported by four separate air springs, and when there is a bias or deviance in distribution of sprung weight among the four rear air springs, height and tilt adjustment of the vehicle by controlling each separate air spring becomes difficult. That is not problematic in the case of trucks and buses, however, in the case of guided vehicles, it is necessary to severely control difference between the platform surface and floor surface of the vehicle to be in a range of ±few millimeters, so that becomes problematic.

The method and device of controlling tilting of the vehicle body aims only to decrease consumption of air required to tilt the vehicle body when the vehicle runs through a curve section of the rail road by communicating the left and right air spring of either of the front or rear bogie, and can not resolve such a problem that occurs when air springs of increased outer diameter are used in order to comply with increased axle load, i.e. decrease in rolling stiffness due to decreased distance between the left and right air spring.

SUMMARY OF THE INVENTION

Therefore, the object of the invention is to provide a guided vehicle of air spring suspension, with which decreasing center distance of the left and right air spring in order to mount air springs of increased diameter and increased load carrying capacity, which decreasing of center distance of the left and right air springs induces decrease in rolling stiffness of the vehicle resulting in deteriorated ride quality and also induces difficulty in adjusting vehicle height resulting in spending long time in height adjusting operation, will not be required even when load carrying capacity of air springs is required to be increased in order to comply with increased vehicle load.

To attain the object, the present invention proposes a guided vehicle for traveling exclusive guideways having air springs to support the vehicle body on axles thereof, wherein the air spring is composed of a plurality of air spring elements connected to one another so that their inside rooms are communicated to one another.

By connecting a plurality of air spring elements to one another so that their inside rooms are communicated to one another, the outer diameter of each air spring can be decreased, and mounting distance between the left and right air springs can be widened by just that much, so rolling stiffness of the vehicle is increased and the vehicle does not rolls easily and ride quality is improved. Further, by communicating the inside rooms, inside pressure of a plurality of the air springs is always equal, so it does not happen that only one air spring supports the load, and as a plurality of the air springs can be located so that virtual center line thereof coincides with the center line of the axle, superfluous back-and-forth bending force does not exerts on the frame.

When manufacturing an air spring of a diameter not commercially available, enormous cost is needed because a mold, or pattern is needed to be made. By using air spring elements of size commercially available as being done in the invention, increase of load of the vehicle can be dealt with at a low cost.

By mounting the air spring such that they are arranged tandem along the longitudinal direction of the vehicle and symmetrically with respect to the center line of the axle of the vehicle, each air spring can be decreased in outer diameter as mentioned before, and by communicating the inside rooms, front and rear air spring elements are always equal in inside air pressure even when the inside pressure fluctuates and the air spring elements work like a single air spring. Therefore, displacements of the left and right air spring elements are always equal and inclination in the anteroposterior direction does not occur, so, vehicle height adjustment is eased as if left and right wheels are suspended respectively by a single air spring. Further, as air spring of smaller diameter are used, it becomes unnecessary to think of widening the width of the vehicle.

By arranging a plurality of air spring elements such that the centers of the spring elements are on a circle, an air spring further increased in load supporting capacity can be obtained.

Spring constant K of an air spring is given by the following equation:

$$K = \gamma \times (P_0/V_0) \times A_0^2$$

where γ is polytropic index of air, $P_0$ is inside air pressure, $V_0$ is inside room volume, and $A_0$ is effective load area of the air spring respectively.

As can be recognized from the above equation, spring constant K reduces with increased inside room volume V.

Therefore, by composing such that a plurality of air spring elements are covered by a common cover-dish, the volume of the common inside room per one element increases, so spring constant can be decreased further, resulting in further improvement of ride quality.

By connecting a plurality of air spring elements via flexible communicating pipes, flatness of installation face to place each of the air spring elements is of no importance, and each air spring elements is allowed to be mounted on each installation face not level with each other as necessary depending on the construction of the vehicle.

As has been mentioned above, the guided vehicle of the invention is provided with a plurality of air spring elements with inside rooms thereof communicated to one another, so the outer diameter of each of them can be decreased. Therefore, the mounting distance between the left and right air spring can be decreased by just that much, rolling stiffness of the vehicle can be increased resulting in improved ride quality, and it becomes unnecessary to think of widening vehicle width, which will result in an increased cost.

Further, by arranging a plurality of air spring elements such that centers of the spring elements are on a circle, an air spring with increased load supporting capacity can be obtained, and further, by composing such that a plurality of air spring elements are covered by a common cover-dish, the volume of the common inside room per one element increases, so spring constant can be decreased, resulting in improvement of ride quality, because spring constant K is inversely proportional to the inside room volume $V_0$.

BRIEF DESCRIPTION OF THE DRAWINGS

FIG. 2A is a diagrammatic front or rear view of the guided vehicle equipped with the air springs of the first embodiment, and FIG. 2B is a diagrammatic partial side view of the vehicle to show the state the axle is suspended via the air springs.

FIG. 7 is a diagrammatic plan view of the conventional guided vehicle showing location of tires and air springs.

DETAILED DESCRIPTION OF THE PREFERRED EMBODIMENTS

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

The First Embodiment

Figure 1A:
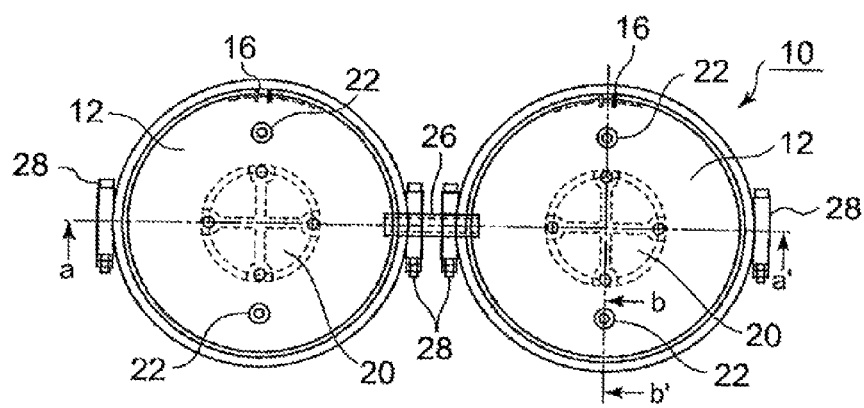
FIG. 1A is a plan view of the first embodiment of an air spring used for the guided vehicle according to the present invention.
Figure 1C:
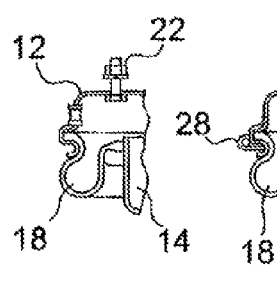
FIG. 1c is partial cross sectional view along line b-b' in FIG. 1A.
Figure 1B:
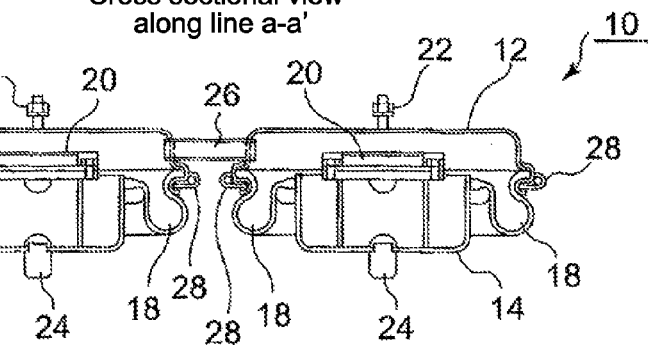
FIG. 1B is a cross sectional view along line a-a' in FIG. 1A.
Figure 3:
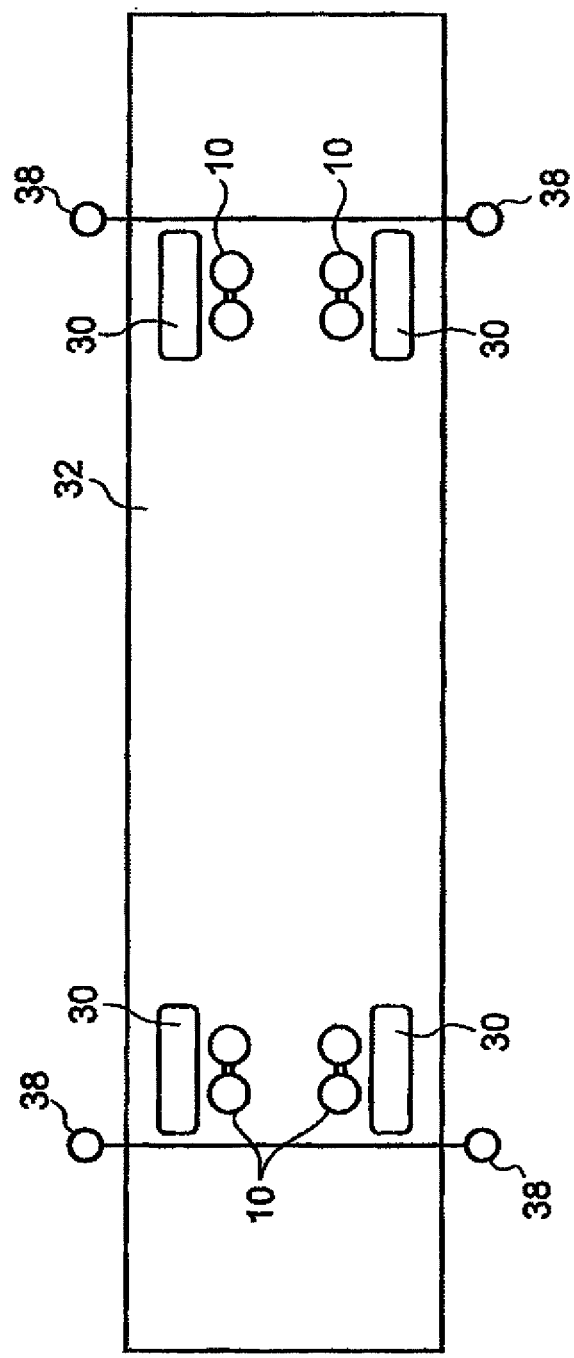
FIG. 3 is a diagrammatic plan view of the guided vehicle showing location of tires and air springs.

FIG. 1A is a plan view of the first embodiment of an air spring used for the guided vehicle according to the present invention, FIG. 1B is a cross sectional view along line a-a' in FIG. 1A, and FIG. 1c is partial cross sectional view along line b-b' in FIG. 1A, FIG. 2A is a diagrammatic front or rear view of the guided vehicle equipped with the air spring set of the first embodiment, and FIG. 2B is a diagrammatic partial side view of the vehicle to show the state the axle is suspended via the air springs, and FIG. 3 is a diagrammatic plan view of the guided vehicle showing location of tires and air springs.

In FIG. 3 showing a diagrammatic plan view of the guided vehicle of the invention, air springs 10 are located between a front left and right wheel 30 and between a rear left and right wheel 30. Reference numeral 32 is a vehicle body, and reference numeral 38 indicates guide wheels. A plurality of air spring elements (two in FIG. 3) including an outer cover 12, an inner case 14 and a rubber diaphragm (bellows) 18 are arranged to compose an air spring 10 (as shown in FIG. 1A) located across the center line connecting the center of the left and right wheel, and the air spring elements of the air spring 10 are communicated so that inside air pressure thereof are always equal.

By connecting a plurality of air spring elements to one another so that their inside rooms are communicated to one another, the outer diameter of each air spring can be decreased. Therefore, mounting distance between the left and right air springs 10 can be widened by just that much, so rolling stiffness of the vehicle 32 is increased and the vehicle does not rolls easily and ride quality is improved. Further, by communicating the inside rooms, inside pressure of a plurality of the air spring elements is always equal, so it does not happen that only one air spring element supports the load, and as a plurality of the air springs can be located so that virtual center line thereof coincides with the center line of the axle, superfluous back-and-forth bending force does not exerts on the frame.

Referring to FIGS. 2A and 2B showing respectively a diagrammatic front or rear view of the guided vehicle equipped with the air springs 10 of the first embodiment and a diagrammatic partial side view thereof, reference numeral 30 are wheels, 32 is a vehicle body, 34 is an axle housing, and 40 is left and right suspension frames. A carriage is provided to the vehicle shown in the drawing via the air springs 10 on the lower side of the vehicle body 32. As shown in FIG. 2B, two air spring elements are arranged tandem along the longitudinal direction of the vehicle and symmetrically with respect to the axle housing 34 that contains the axle of the vehicle. Also, the air spring elements of each air spring 10 are connected via a communicating pipe 26 so that inside air pressure thereof is always equal.

As shown in FIG. 2B, an end of each of two parallel links 36 is pivotally fixed to the vertical part of each of the left and right suspension frames 40. The air springs 10 are located between the basal portion of the suspension frame 40 fixed at the bottom part of the vehicle body and the axle housing 34 fixed to the carriage side.

A first embodiment of the air spring is shown in FIGS. 1A-1C. Each air spring element of the air spring 10 of the first embodiment is comprised of the air spring element including the outer case 12, the inner case 14, and the annular rubber diaphragm (bellows) 18 connecting the outer periphery of the inner case 14 and that of the air spring element. The inner periphery of the rubber diaphragm (bellows) 18 is fixed to the outer periphery of the inner case 14, and the outer periphery of the bellows 18 is clamped to the outer periphery of the air spring element via a circular clamp 28. Reference numeral 16 is an air inlet, 22 is an outer cover-fixing bolt. The air spring 10 is fixed to the horizontal part of the suspension frame 40 by an outer case-fixing bolt 22. Reference numeral 20 is a stopper supported by the bottom of the inner case 14. The stopper 20 restricts vertical movement of the inner dish 14. Reference numeral 24 is a positioning pin attached to the bottom of the inner case 14 to position of the air spring 10, and reference numeral 26 is the communication pipe.

Each of the two air spring elements of the air springs 10 of the first embodiment provided with the inner case 14 located concentrically to the air spring element, and the diaphragm 18 composed of rubber bellows, is connected to each other by the communicating pipe 26 so that inside pressure of both the air spring elements is always equal. The communicating pipe 26 may be a metal pipe or flexible rubber hose. The inner diameter of the communicating pipe 26 is preferably 15φ or larger so that inside pressure of both air springs is always equalized.

When the communicating pipe 26 is made of flexible pipe such as a rubber hose, evenness or flatness of the face of a flange for mounting the air springs 10 is not a point to take care of, and it is permissible that each flange face for mounting each air spring 10 of the air spring set is not leveled with each other.

The stopper 20 is to prevent the air spring 10 to be pressed over the shrinkage stroke between the air spring element and the stopper 20 when some weights are added onto the air spring elements. Further, since the diaphragm 18 is actuated from the up and down displacement, the shape of the diaphragm 18 in planar view is circular geometry, and other shapes are not preferred as the deformation of the diaphragm becomes locally uneven causing the durability of the diaphragm decreased.

Therefore, as clear from FIGS. 1B and 1C, the diaphragm 18 is formed in same form around the inner case 14. The inner pressure of the air spring is controlled by admitting and releasing the compressed air through the air inlet 16 from a compressed air tank (not shown). Moreover, the air spring is fixed by the outer case fixing bolt 22 and the positioning pin 24.

Although in the embodiment, two air spring elements are arranged tandem along the longitudinal direction of the vehicle body and symmetrically with respect to the axle center line, and connected by a communicating pipe, it is also possible to arrange more than two air spring elements along the longitudinal direction of the vehicle body and symmetrically with respect to the axle center line, and connect them with communication pipes.

The Second Embodiment

Figure 4A:
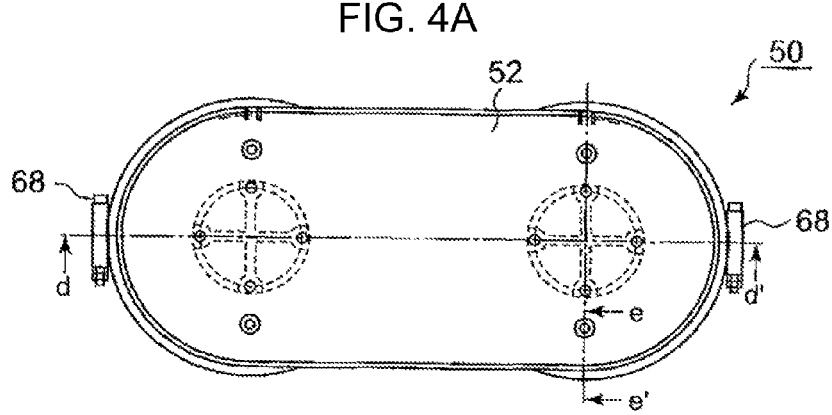
FIG. 4A is a plan view of the second embodiment of an air springs used for the guided vehicle according to the present invention.
Figure 4B:
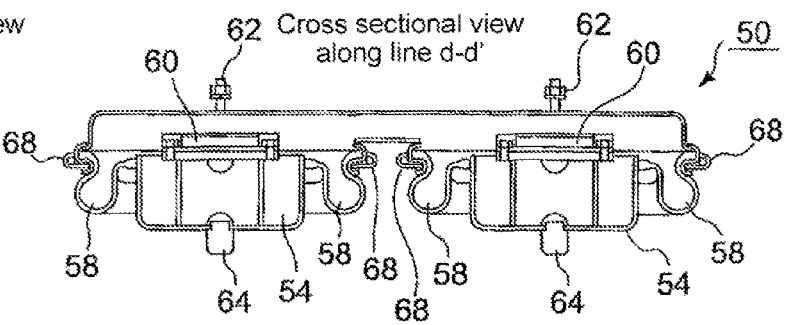
FIG. 4B is a cross sectional view along line d-d' in FIG. 4A.
Figure 4C:
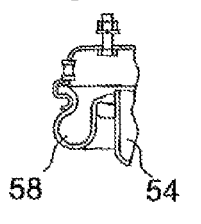
FIG. 4C is partial cross sectional view along line e-e' in FIG. 4A.

A second embodiment of air springs is shown in FIGS. 4A-4C. FIG. 4A is a plan view, FIG. 4B is a section along line d-d' in FIG. 4A, and FIG. 4C is a partial cross section along line e-e' in FIG. 4A.

In the embodiment, the inner case and diaphragm are the same as those of the first embodiment shown in FIG. 1, and an outer case having a common inside air room as versus providing communication pipe in the case of the first embodiment is provided covering air spring elements to constitute an air spring.

In FIGS. 4A-4C, reference numeral 50 is an air spring, and reference numeral 52 is an outer case covering the spring elements each of which includes an inner case 54, an annular diaphragm 58, a stopper 60, and these are the same as those of FIG. 1 as can be recognized from the figures. Reference numeral 62 is an outer case fixing bolt, reference numeral 64 is a inner case positioning pin, and reference numeral 68 is a circular clamp.

By providing the outer case 52, volume of the closed room (inside volume) formed by the inner case 54, the diaphragms 58, and the cover-dish 52 increases as compared with the air spring of FIG. 1. Therefore, spring constant can be reduced, resulting in improved ride quality. Spring constant K of an air spring is given by the following equation:

$$K = \gamma \times (P_0/V_0) \times A_0^2$$

where $\gamma$ is polytropic index of air, $P_0$ is inside air pressure, $V_0$ is inside air room volume, and $A_0$ is effective load area of the air spring respectively.

As can be recognized from the above equation, spring constant K is inversely proportional to inside air room volume $V_0$, so spring constant of the air spring of FIG. 4 is decreased due to increased inside volume $V_0$ as compared with the air spring of FIG. 1, and ride quality is improved.

The Third Embodiment

Figure 5A:
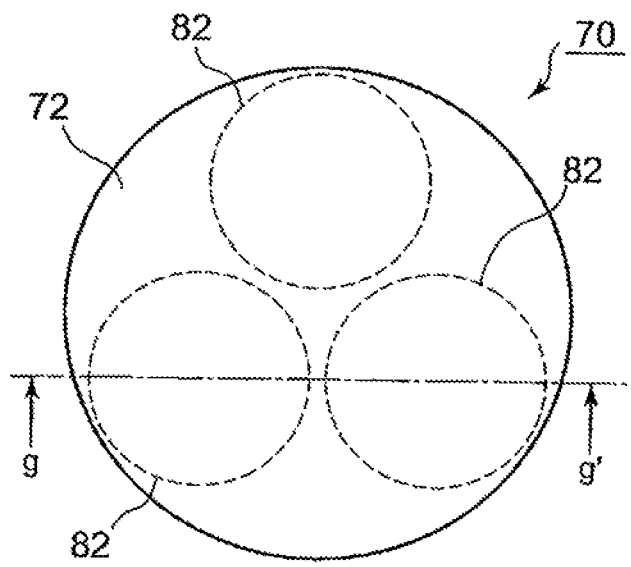
FIG. 5A is a plan view of the third embodiment of an air spring used for the guided vehicle according to the present invention.
Figure 5B:
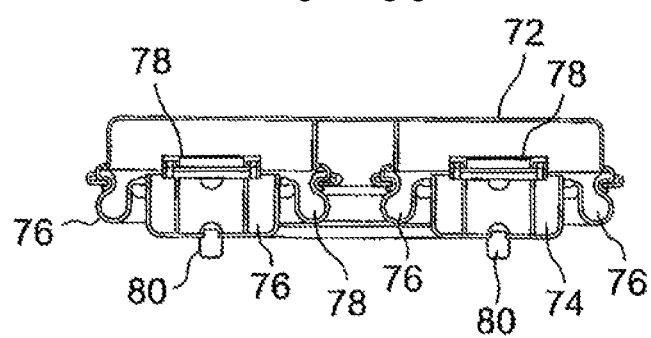
FIG. 5B is a cross sectional view along line g-g' in FIG. 5A.
Figure 6A:
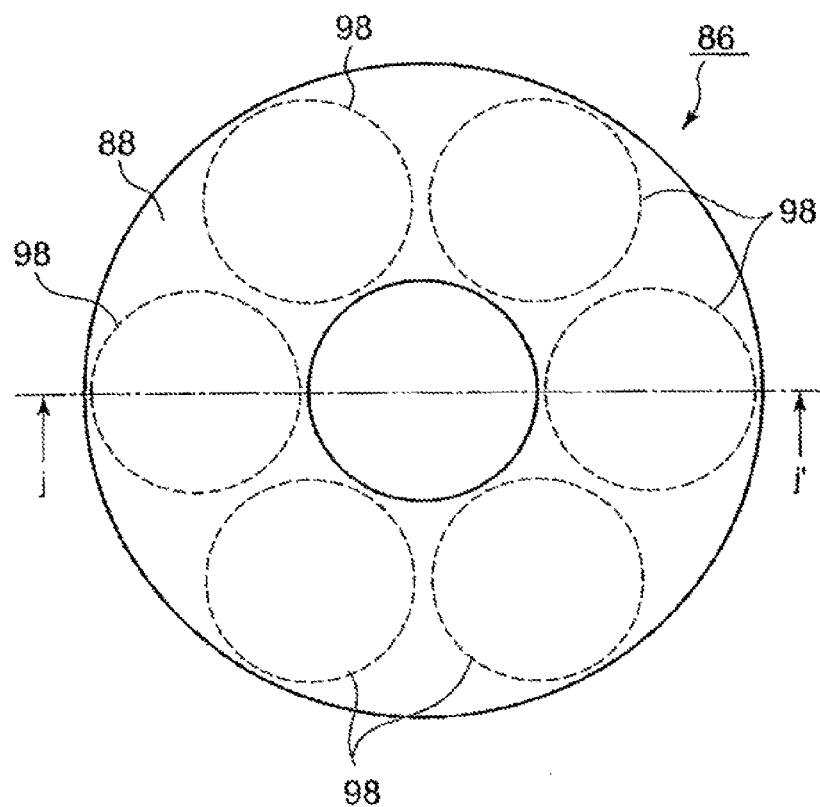
FIG. 6A is a plan view of the third embodiment of an air spring used for the guided vehicle according to the present invention.
Figure 6B:
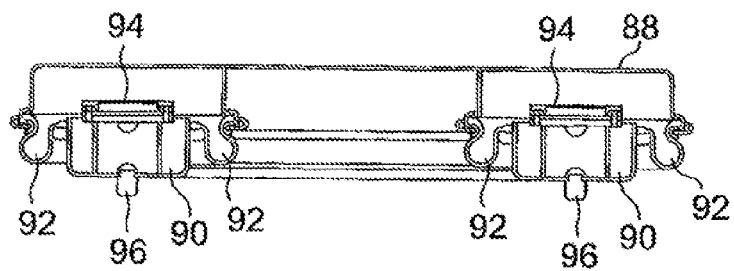
FIG. 6B is a cross sectional view along line j-j' in FIG. 6A.

When minor decrease in center distance of the left and right air spring by using inner case is permissible for example in an auto truck, etc., improvement of ride quality can be achieved by providing an inner case for more than two air spring elements arranged circularly as shown in FIGS. 5 and 6, resulting from reduced spring constant caused by increased inside air room volume.

FIG. 5 shows an air spring 70 consisting of three air spring elements 82 covered by an outer case 72 so that the closed inside room is common for the three air spring elements. Each of the air spring elements 82 includes an inner case 74, an annular rubber diaphragm 76, a stopper 78, and a positioning pin 80. The three air spring elements are arranged such that the centers thereof are on a circle.

FIG. 6 shows an air spring 86 consisting of six air spring elements 98 covered by an outer case 88 so that the closed inside room is common for the six air spring elements. Each of the air spring elements 98 includes an inner case 90, an annular rubber diaphragm 92, a stopper 94, and a positioning pin 96. The six air spring elements are arranged such that the centers thereof are on a circle. By arranging a plurality of air spring elements and covering them with an outer case, the volume of the inside closed air room can be increased as compared with the case in which a plurality of air spring elements are arranged and their inside closed air rooms are communicated, so spring constant can be decreased and ride quantity can be increased. The air spring elements of the invention work as a single air spring because each of the constituent air springs or constituent air spring elements actuate under the same air pressure.

Further, in order to provide an air spring of large effective load area not commercially viable, it is needed to begin from making a mold for forming constituent parts of the air spring, which will result in high manufacturing cost. By utilizing a plurality of air spring elements of commonly used sizes to compose an air spring of large effective load area, an air spring of very large load carrying capacity can be provided at low cost.

According to the invention, a guided vehicle equipped with air springs of large load carrying capacity to comply with increased vehicle load and having increased ride quality can be provided.

The invention claimed is:

1. A guided vehicle having air springs to support a vehicle body on carriages for traveling exclusive guideways, the guided vehicle comprising:
   suspension frames projecting downward on a lower side of the vehicle body;
   parallel links extending in a longitudinal direction of the vehicle, one end of each parallel link pivotally fixed to the corresponding suspension frame and another end of the parallel link pivotally fixed to the corresponding carriage; and
   an axle housing fixed to the carriages and including an axle, wherein
   each of the air springs includes a plurality of air spring elements that are arranged tandem along the longitudinal direction and symmetrically with respect to a center line of the axle housing,
   the plurality of air spring elements arranged at both right and left sides in a width direction of the vehicle body are provided with a common cover-dish, and the common cover dish partially defines communicating inside rooms so that the plurality of air spring elements are connected to one another.

2. The guided vehicle according to claim 1, wherein said plurality of air spring elements are arranged such that the centers of the spring elements are on a circle.

* * * * *